United States Patent
Minami et al.

(10) Patent No.: US 9,803,612 B2
(45) Date of Patent: Oct. 31, 2017

(54) CONTROL DEVICE FOR INTERNAL COMBUSTION ENGINE

(71) Applicant: DENSO CORPORATION, Kariya, Aichi-pref. (JP)

(72) Inventors: Keitarou Minami, Kariya (JP); Hideaki Ichihara, Obu (JP); Hiroyuki Takezoe, Tokai (JP); Hiroshi Katsurahara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 232 days.

(21) Appl. No.: 14/255,432

(22) Filed: Apr. 17, 2014

(65) Prior Publication Data

US 2014/0311450 A1   Oct. 23, 2014

(30) Foreign Application Priority Data

Apr. 17, 2013   (JP) .................................. 2013-086214

(51) Int. Cl.
*B60K 1/00*   (2006.01)
*F02P 5/04*   (2006.01)
(Continued)

(52) U.S. Cl.
CPC .......... *F02P 5/045* (2013.01); *F02D 41/0072* (2013.01); *F02P 5/1516* (2013.01);
(Continued)

(58) Field of Classification Search
CPC ..... F02P 5/045; F02P 5/1516; F02D 41/0072; F02D 2041/1412; F02D 2041/1431; F02D 2200/1015; F02D 2200/0402; G01M 15/11
(Continued)

(56) References Cited

U.S. PATENT DOCUMENTS 5,749,334 A * 5/1998 Oda ........................ F02B 47/08
                                                           123/305
2003/0125161 A1* 7/2003 Tokura .................. F16H 61/061
                                                           477/176
(Continued)

FOREIGN PATENT DOCUMENTS

JP   2009-281261   12/2009
JP   2010-001796   1/2010
JP   2012-167601   9/2012

*Primary Examiner* — Hai Huynh
*Assistant Examiner* — Gonzalo Laguarda
(74) *Attorney, Agent, or Firm* — Nixon & Vanderhye PC

(57) ABSTRACT

A cylinder-inflow EGR gas amount is estimated, a misfire limit EGR gas amount is calculated on the basis of an engine operation state, and the misfire limit EGR gas amount is compared with the cylinder-inflow EGR gas amount to predict whether a misfire occurs. When the misfire is predicted, a misfire avoidance control is executed. Further, an actual misfire countermeasure effect amount in a case of the execution of the misfire avoidance control is calculated, and the actual misfire countermeasure effect amount is compared with a required misfire countermeasure effect amount to determine whether the misfire is avoidable when the misfire avoidance control is executed. If the misfire is unavoidable even if the misfire avoidance control is executed, a delay restriction value of an ignition timing to avoid the misfire is calculated, and the amount of a delay in the ignition timing is restricted using the delay restriction value.

5 Claims, 12 Drawing Sheets

(51) Int. Cl.
*F02D 41/00* (2006.01)
*F02P 5/15* (2006.01)
*F02D 41/14* (2006.01)

(52) U.S. Cl.
CPC ........... *F02D 2041/1412* (2013.01); *F02D 2041/1431* (2013.01); *F02D 2200/0402* (2013.01); *F02D 2200/1015* (2013.01); *F02D 2250/24* (2013.01); *Y02T 10/46* (2013.01); *Y02T 10/47* (2013.01)

(58) Field of Classification Search
USPC ............ 701/111, 108; 123/406.48, 568.21; 73/114.02, 114.62, 114.74
See application file for complete search history.

(56) References Cited

U.S. PATENT DOCUMENTS

| | | | |
|---|---|---|---|
| 2008/0178848 A1* | 7/2008 | Duffy | F02D 41/0065 123/481 |
| 2010/0162707 A1* | 7/2010 | Ando | F02P 5/1516 60/719 |
| 2012/0303247 A1 | 11/2012 | Minami et al. | |
| 2012/0303249 A1 | 11/2012 | Minami et al. | |
| 2014/0020664 A1* | 1/2014 | Yoshioka | F02B 33/00 123/559.1 |

* cited by examiner

FIG. 5

MISFIRE AVOIDANCE CONTROL SELECTION MAP

| MISFIRE AVOIDANCE CONTROL | MISFIRE LIMIT EXPANSION EFFECT AMOUNT (%) | FUEL CONSUMPTION DETERIORATION DEGREE | DRIVABILITY DETERIORATION DEGREE | RESPONSIVENESS DETERIORATION DEGREE | EMISSIONS DETERIORATION DEGREE |
|---|---|---|---|---|---|
| (a) | 3 | 3 | 2 | 1 | 2 |
| (b) | 2 |  | 1 | 2 | 3 |
| (c) | 4 | 3 | 3 | 1 | 1 |
| (d) | 2 | 1 | 1 | 2 | 3 |
| ... | ... | ... | ... | ... | ... |

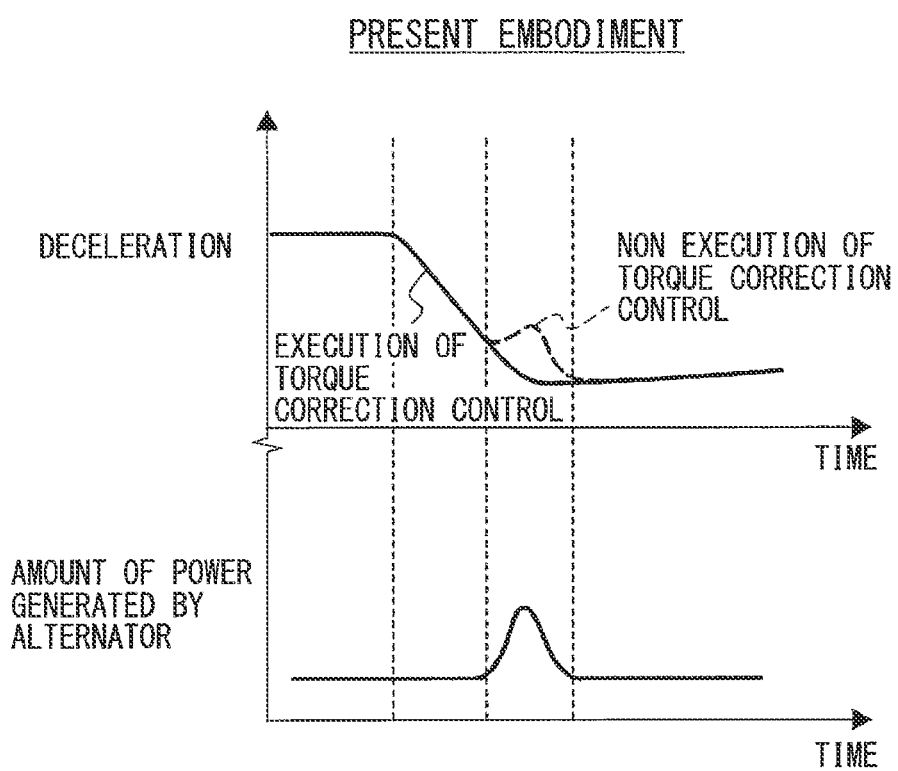

CONTROL DEVICE FOR INTERNAL COMBUSTION ENGINE

CROSS REFERENCE TO RELATED APPLICATION

This application is based on and incorporates herein by reference Japanese Patent Application No. 2013-86214 filed on Apr. 17, 2013.

TECHNICAL FIELD

The present disclosure relates to a control device for an internal combustion engine provided with an EGR device that recirculates, as EGR gas, a portion of exhaust gas of the internal combustion engine to an intake passage.

BACKGROUND

For the purpose of improving fuel consumption and reducing knocking or exhaust emissions, an internal combustion engine for a vehicle, which is provided with an EGR device that recirculates a portion of exhaust gas as an EGR gas to an intake passage, has been proposed.

However, in an internal combustion engine having an EGR device mounted therein, even though an EGR valve is closed when a throttle valve closes at the time of deceleration, EGR gas may remain within an EGR passage or an intake passage on a downstream side of the EGR valve. In particular, in a system that recirculates EGR gas to an intake passage on an upstream side of a throttle valve, a large amount of EGR gas may remain within the intake passage on the upstream side of the throttle valve. For this reason, a combustion state may deteriorate due to an excessive increase in the amount of EGR gas flowing into a cylinder at the time of deceleration and a subsequent re-acceleration. As a result, a misfire is likely to occur.

To solve such a problem, for example, as disclosed in a patent document (JP 2013-11271 A), a cylinder-inflow EGR gas amount of an internal combustion engine is estimated, and a misfire limit EGR gas amount is calculated on the basis of an operation state of the internal combustion engine. Then, the misfire limit EGR gas amount is compared with the cylinder-inflow EGR gas amount to predict whether a misfire may occur. When it is predicted that the misfire may occur, misfire avoidance control (e.g., fuel injection amount increase control) is executed to avoid the misfire.

However, in a system that provides deceleration by delaying an ignition timing of an internal combustion engine at the time of deceleration (i.e., by increasing an ignition timing delay amount) to decrease torque, a misfire limit is decreased when delaying the ignition timing at the time of deceleration. For this reason, even when the above-described misfire avoidance control is executed, the effects for avoiding a misfire may be insufficient depending on deceleration conditions, resulting in failing to avoid the misfire. Whereas, when the amount of EGR gas is decreased in order to avoid the misfire, fuel efficiency effects through EGR gas may deteriorate.

SUMMARY

Consequently, an object of the present disclosure is to provide a control device for an internal combustion engine, to avoid a misfire due to EGR gas while maintaining fuel efficiency benefits due to the EGR gas.

According to an aspect of the present disclosure, a control device for an internal combustion engine, which is provided with an EGR device recirculating, as EGR gas, a portion of exhaust gas of an internal combustion engine to an intake passage, delays an ignition timing of the internal combustion engine at the time of deceleration. The control device includes a cylinder-inflow EGR gas amount determination portion that determines a cylinder-inflow EGR gas amount of EGR gas flowing into a cylinder of the internal combustion engine. The control device further includes a misfire occurrence prediction portion that predicts whether a misfire occurs, based on the cylinder-inflow EGR gas amount and an operation state of the internal combustion engine, a misfire avoidance control portion that executes misfire avoidance control to avoid the misfire when the misfire occurrence prediction portion predicts the misfire, a misfire avoidance determination portion that determines whether the misfire is unavoidable even if the misfire avoidance control is executed, and an ignition delay restriction portion that restricts a delay in the ignition timing when the misfire avoidance determination portion determines that the misfire is unavoidable.

In this configuration, since misfire avoidance control can be executed regardless of deceleration and re-acceleration, when it is predicted that a misfire may occur due to an excessive increase in a cylinder-inflow EGR gas amount, a misfire during the deceleration and the re-acceleration due to the EGR gas is avoidable. In addition, when it is determined that a misfire is unavoidable even if misfire avoidance control is executed, a delay in an ignition timing is restricted. Thus, it is possible to improve a combustion state to thereby suppress a reduction in a misfire limit and to avoid a misfire due to the misfire avoidance control. In this case, since a decrease in the amount of EGR gas is not necessary to avoid the misfire, it is possible to maintain fuel efficiency effects due to the EGR gas.

BRIEF DESCRIPTION OF THE DRAWINGS

The disclosure, together with additional objectives, features and advantages thereof, will be best understood from the following description, the appended claims and the accompanying drawings, in which:

FIG. 5 is a diagram illustrating an example of a misfire avoidance control selection map;

FIG. 12 is a time chart illustrating an execution example of torque correction control at the time of misfire avoidance control according to the embodiment.

DETAILED DESCRIPTION

Hereinafter, a description will be given of an embodiment in which a mode for carrying out the present disclosure is embodied.

Figure 1:
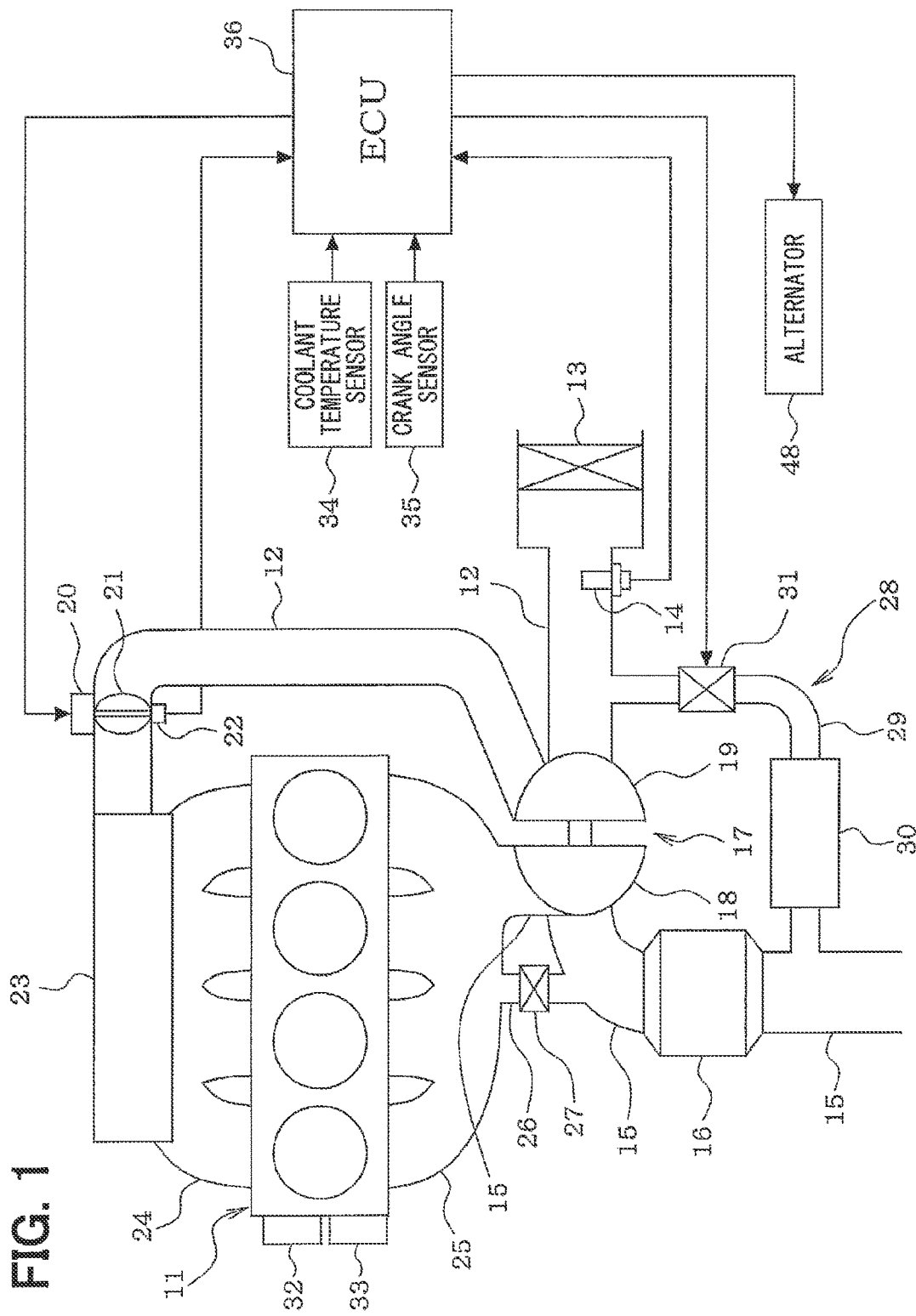
FIG. 1 is a diagram illustrating a schematic configuration of an engine control system according to an embodiment of the present disclosure.

First, a schematic configuration of an engine control system will be described with reference to FIG. 1.

An air cleaner 13 is provided in a furthest upstream portion of an intake pipe 12 (i.e., intake passage) of an engine 11 which is an internal combustion engine, and an airflow meter 14 that detects a flow rate of intake air (i.e., fresh air) is provided on a downstream side of the air cleaner 13. On the other hand, an exhaust pipe 15 (i.e., exhaust passage) of the engine 11 is provided with a catalyst 16 such as a three-way catalyst which purifies CO, HC, NOx, and the like of exhaust gas.

An exhaust turbine driving type turbocharger 17, which supercharges intake air, is mounted in the engine 11. In the turbocharger 17, an exhaust turbine 18 is disposed on an upstream side of the catalyst 16 in the exhaust pipe 15, and a compressor 19 is disposed on a downstream side of the airflow meter 14 in the intake pipe 12. In the turbocharger 17, the exhaust turbine 18 and the compressor 19 are connected to each other and rotate integrally. The compressor 19 is rotated by rotating the exhaust turbine 18 by kinetic energy of exhaust gas, thereby supercharging the intake air.

A throttle valve 21 of which the opening degree is adjusted by a motor 20 and a throttle opening degree sensor 22 detecting the opening degree (i.e., throttle opening degree) of the throttle valve 21 are provided on a downstream side of the compressor 19 in the intake pipe 12.

Further, on a downstream side of the throttle valve 21, an intercooler that cools intake air is provided integrally with a surge tank 23. The intercooler may be disposed on an upstream side of the surge tank 23 and the throttle valve 21. The surge tank 23 is provided with an intake manifold 24 that guides air into the respective cylinders of the engine 11, and each cylinder is provided with a fuel injection valve (not shown) that performs cylinder injection or intake port injection. A spark plug (not shown) is attached to a cylinder head of each cylinder, and mixed air within each cylinder is ignited by spark discharge of each spark plug.

An exhaust manifold 25 is connected to an exhaust port of each cylinder of the engine 11, and a downstream side merging portion of the exhaust manifold 25 of each cylinder is connected to the exhaust pipe 15 on an upstream side of the exhaust turbine 18. In addition, an exhaust bypass passage 26 that bypasses the upstream side and the downstream side of the exhaust turbine 18 is provided, and the exhaust bypass passage 26 is provided with a waste gate valve 27 that opens and closes the exhaust bypass passage 26.

An LPL type (i.e., low pressure loop type) EGR device 28, which recirculates a portion of exhaust gas as EGR gas to the intake pipe 12 from the exhaust pipe 15, is mounted in the engine 11. In the EGR device 28, an EGR piping 29 (i.e., EGR passage) is connected between the downstream side of the exhaust turbine 18 in the exhaust pipe 15 (e.g., the downstream side of the catalyst 16) and the upstream side of the compressor 19 in the intake pipe 12 (an intake passage on the upstream side of the throttle valve 21), and the EGR piping 29 is provided with an EGR cooler 30 that cools the EGR gas and an EGR valve 31 that adjusts a flow rate of the EGR gas. An opening degree of the EGR valve 31 is adjusted by an actuator (not shown) such as a motor. When the EGR valve 31 is opened, the EGR gas is recirculated from the downstream side of the catalyst 16 in the exhaust pipe 15 to the upstream side of the compressor 19 in the intake pipe 12.

In addition, the engine 11 is provided with an intake side variable valve timing mechanism 32 that changes a valve timing (opening and closing timings) of an intake valve (not shown), and an exhaust side variable valve timing mechanism 33 that changes a valve timing of an exhaust valve (not shown). Besides, the engine 11 is provided with a coolant temperature sensor 34, a crank angle sensor 35, and the like. The coolant temperature sensor 34 detects the temperature of a coolant, and the crank angle sensor 35 outputs a pulse signal every time a crank shaft (not shown) rotates at a predetermined crank angle. A crank angle and an engine rotation speed are detected on the basis of the output signal of the crank angle sensor 35.

Outputs of these sensors are input into an electronic control unit 36 (hereinafter, referred to as "ECU"). The ECU 36 includes a microcomputer as its main component. The ECU 36 executes various engine control programs stored in a built-in ROM (i.e., storage medium) to control a fuel injection amount, an ignition timing, a throttle opening degree (i.e., intake air amount), and the like on the basis of an engine operation state.

At that time, the ECU 36 calculates a target EGR rate on the basis of an engine operation state (e.g., an engine load and an engine rotation speed) and controls the opening degree of the EGR valve 31 to realize the target EGR rate.

Figure 2:
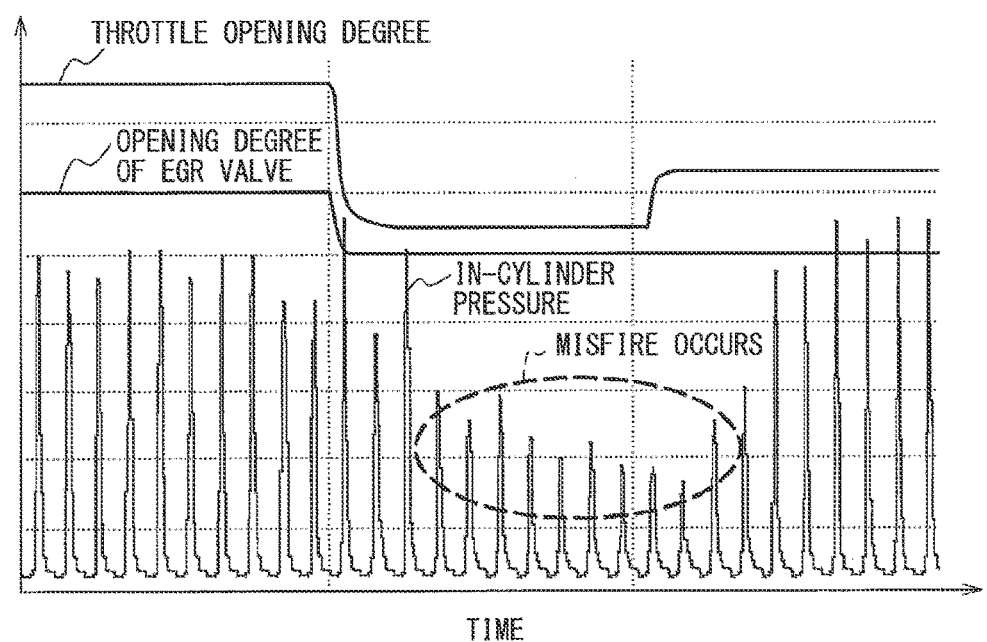
FIG. 2 is a time chart illustrating a misfire at the time of deceleration and re-acceleration due to EGR gas.

As illustrated in FIG. 2, in the engine 11 having the EGR device 28, even though the EGR valve 31 is closed when a throttle opening degree is adjusted to a closing side at the time of deceleration, EGR gas may remain within the EGR piping 29 and the intake pipe 12 on the downstream side of the EGR valve 31. In particular, in a system that recirculates EGR gas to an intake passage on the upstream side of the throttle valve 21, a large amount of EGR gas remains within the intake passage on the upstream side of the throttle valve 21. For this reason, a combustion state may deteriorate due to an excessive increase in the amount of EGR gas flowing into a cylinder at the time of deceleration and the subsequent re-acceleration and thus a misfire may occur.

In order to deal with the above, in this embodiment, routines for misfire avoidance control of FIGS. 3 and 4, which will be described below, are executed by the ECU 36. That is, a cylinder-inflow EGR gas amount (i.e., the amount of EGR gas flowing into a cylinder) is estimated by an estimation method (see FIGS. 6 to 9) to be described below, and a misfire limit EGR gas amount which is an upper limit value of a normally-combustible (i.e., combustible without a misfire) cylinder-inflow EGR gas amount is calculated on the basis of an engine operation state. Then, the cylinder-inflow EGR gas amount is compared with the misfire limit EGR gas amount to predict whether a misfire may occur. When it is predicted that a misfire may occur, misfire avoidance control to control a misfire to be avoided is executed. At that time, a required misfire countermeasure effect amount necessary for misfire avoidance is calculated on the basis of a difference between the cylinder-inflow EGR gas amount and the misfire limit EGR gas amount, and then misfire avoidance control is executed according to the required misfire countermeasure effect amount.

A cylinder-inflow EGR rate and a misfire limit EGR rate may be used instead of the cylinder-inflow EGR gas amount and the misfire limit EGR gas amount.

Cylinder inflow EGR rate=(cylinder-inflow EGR gas amount/total cylinder-inflow gas amount)

Misfire limit EGR rate=(misfire limit EGR gas amount/total cylinder-inflow gas amount)

The relation of "total cylinder-inflow gas amount=cylinder-inflow fresh air amount+cylinder-inflow EGR gas amount" is satisfied.

However, in a system that secures deceleration by executing control (i.e., control to increase an ignition timing delay amount) to delay an ignition timing of the engine 11 at the time of deceleration to decrease torque, a misfire limit is reduced when delaying the ignition timing at the time of deceleration. For this reason, even though the above-described misfire avoidance control is executed, the effects thereof may be insufficient depending on deceleration conditions, and thus a misfire may occur.

According to this embodiment, however, a actual misfire countermeasure effect amount in a case of the execution of misfire avoidance control is calculated, and the actual misfire countermeasure effect amount is compared with the required misfire countermeasure effect amount to determine whether a misfire is avoidable when misfire avoidance control is executed. When it is determined that a misfire is unavoidable in spite of the execution of the misfire avoidance control, a delay restriction value of an ignition timing which is necessary for the misfire to be avoidable by the misfire avoidance control is calculated, and the ignition timing delay amount is restricted using the delay restriction value. Thus, it is possible to suppress a reduction in a misfire limit by improving a combustion state and to avoid a misfire by the misfire avoidance control.

Hereinafter, a description will be given of processing details of routines for misfire avoidance control of FIGS. 3 and 4 which are executed by the ECU 36 in this embodiment.

(Misfire Avoidance Control)

Figure 3:
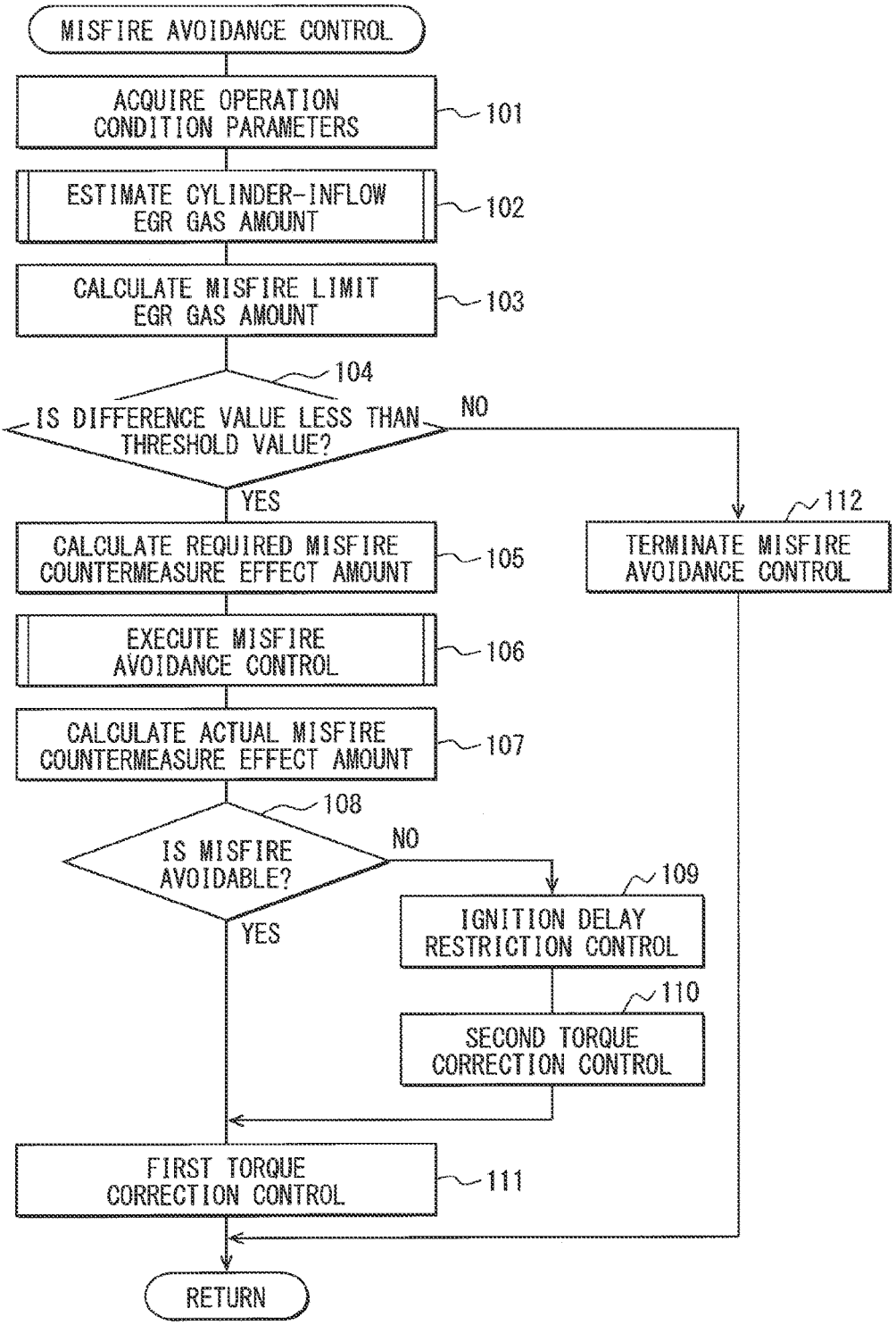
FIG. 3 is a flow chart illustrating a flow of processing of a misfire avoidance control routine.

A misfire avoidance control routine illustrated in FIG. 3 is repeatedly executed at a predetermined cycle during a power-on period of the ECU 36 (i.e., during an ON period of an ignition switch). When the routine is started, first at step 101, engine operation condition parameters (e.g., an engine rotation speed, intake air amount, and an ignition timing) are read.

Thereafter, the process proceeds to step 102 to execute a cylinder-inflow EGR gas amount estimation routine not shown in the drawing, and thus a cylinder-inflow EGR gas amount is estimated by an estimation method (see FIGS. 6-9) to be described below. The process at step 102 serves as a cylinder-inflow EGR gas amount determination portion which is recited in claims.

Thereafter, the process proceeds to step 103 to calculate the misfire limit EGR gas amount (i.e., an upper limit value of a normally-combustible cylinder-inflow EGR gas amount) by using a map, a mathematical equation, or the like on the basis of an engine operation state (e.g., intake air amount or an ignition timing). The map, the mathematical equation, or the like for the misfire limit EGR gas amount is created in advance on the basis of experimental data, design data, and the like, and is stored in a ROM of the ECU 36. The process of step 103 serves as a misfire limit EGR gas amount calculation portion which is recited in claims.

Thereafter, the process proceeds to step 104 to compare the cylinder-inflow EGR gas amount and the misfire limit EGR gas amount to predict whether a misfire may occur. Specifically, it is predicted whether a misfire may occur according to whether a difference value between the misfire limit EGR gas amount and the cylinder-inflow EGR gas amount is less than a predetermined threshold value. When the cylinder-inflow EGR gas amount exceeds the misfire limit EGR gas amount, a misfire occurs. Thus, it is possible to predict whether a misfire may occur with a high level of accuracy by determining whether the difference value between the misfire limit EGR gas amount and the cylinder-inflow EGR gas amount is less than the threshold value. The process of step 104 serves as a misfire occurrence prediction portion which is recited in claims.

When it is predicted at step 104 that a misfire may occur, i.e., when it is determined that the difference value between the misfire limit EGR gas amount and the cylinder-inflow EGR gas amount is less than the threshold value, the process proceeds to step 105 to calculate a required misfire countermeasure effect amount necessary for misfire avoidance by using a map, a mathematical equation, or the like on the basis of the difference between the cylinder-inflow EGR gas amount and the misfire limit EGR gas amount. In other words, an excess of the cylinder-inflow EGR gas amount with respect to the misfire limit EGR gas amount, which serves as information on the degree of combustion deterioration. The map, the mathematical equation, or the like for the required misfire countermeasure effect amount is set in advance on the basis of experimental data, design data, and the like, and is stored in the ROM of the ECU 36. The process of step 105 serves as a required misfire countermeasure effect amount calculation portion which is recited in claims.

A value obtained by dividing the difference between the cylinder-inflow EGR gas amount and the misfire limit EGR gas amount (i.e., an excess of the cylinder-inflow EGR gas amount with respect to the misfire limit EGR gas amount) by a total cylinder-inflow gas amount may be calculated as the required misfire countermeasure effect amount. Alternatively, when a cylinder-inflow EGR rate and a misfire limit EGR rate are used instead of the cylinder-inflow EGR gas amount and the misfire limit EGR gas amount, a difference between the cylinder-inflow EGR rate and the misfire limit EGR rate (i.e., an excess of the cylinder-inflow EGR rate with respect to the misfire limit EGR rate) may be calculated as the required misfire countermeasure effect amount.

Thereafter, the process proceeds to step 106 to execute a misfire avoidance control execution routine of FIG. 4, and thus misfire avoidance control is executed in the following manner under conditions according to the required misfire countermeasure effect amount necessary for misfire avoidance. The routine of FIG. 4 serves as a misfire avoidance control portion which is recited in claims.

Figure 4:
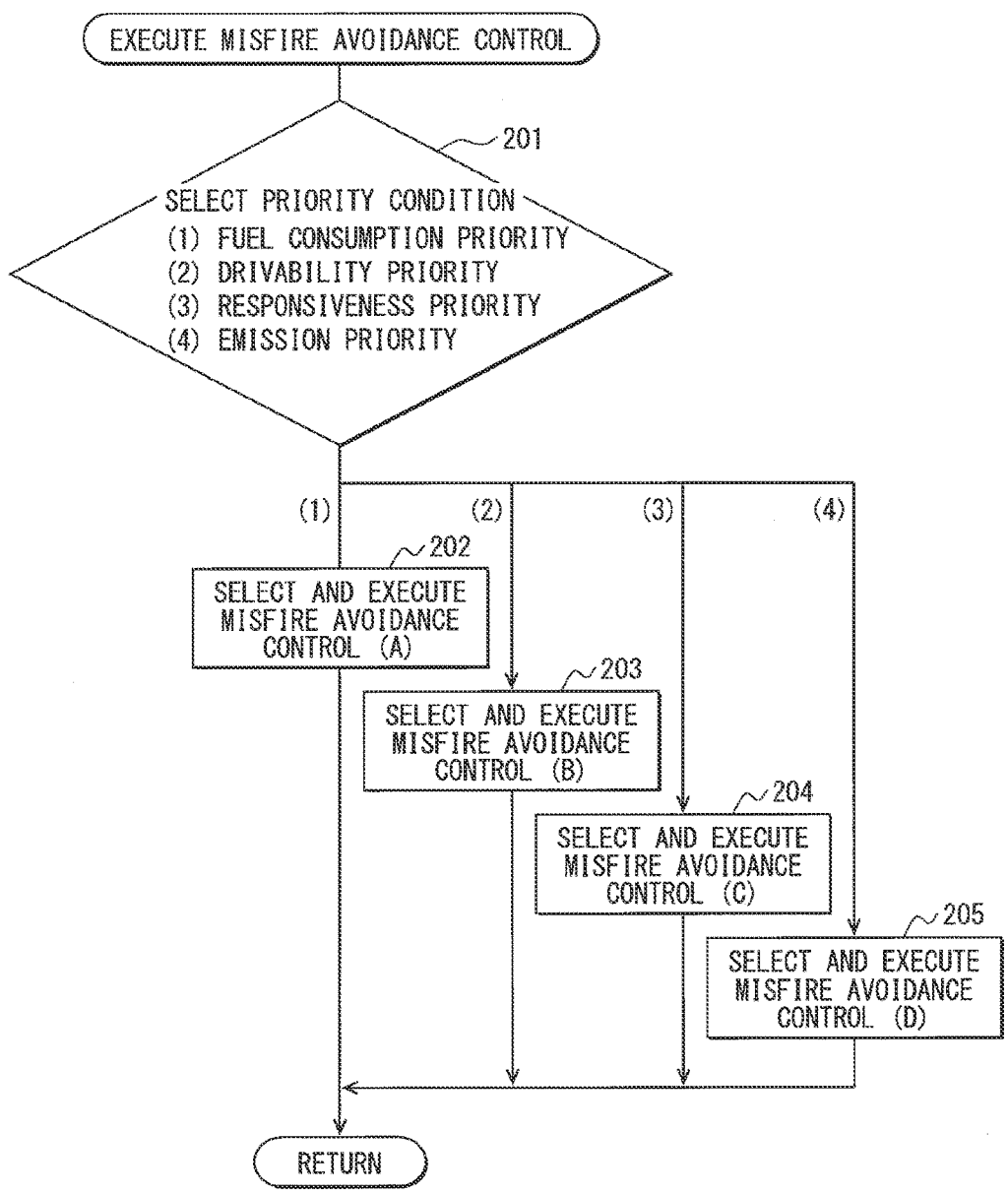
FIG. 4 is a flow chart illustrating a flow of processing of a misfire avoidance control execution routine.

In the routine of FIG. 4, first at step 201, a current priority condition is selected from the following priority conditions (1) to (4) on the basis of a present operation state (e.g., an engine rotation speed, a load, a vehicle speed, an accelerator opening degree, and a shift position of a shift lever) and a traveling mode (e.g., an economy mode or a sport mode) which is currently selected.

(1) Fuel consumption priority
   (2) Drivability priority
   (3) Responsiveness priority
   (4) Emissions priority At step 201, the current priority condition is selected from the priority conditions (1) to (4) stated above. Then, misfire avoidance control satisfying the required misfire countermeasure effect amount and the current priority condition is selected from a plurality of types of misfire avoidance control by using a misfire avoidance control selection map illustrated in FIG. 5 at any one of the subsequent steps 202 to 205, and the selected misfire avoidance control is executed. In the misfire avoidance control selection map of FIG. 5, a misfire limit expansion effect amount, a fuel consumption deterioration degree, a drivability deterioration degree, a responsiveness deterioration degree, and an emissions deterioration degree are set for each misfire avoidance control with respect to the plurality of types of misfire avoidance control. The misfire avoidance control selection map is set in advance on the basis of experimental data, design data, and the like, and is stored in the ROM of the ECU 36.

Specifically, when (1) the fuel consumption priority is selected as the current priority condition at step 201 stated above, the process proceeds to step 202 to select a combination of the misfire avoidance controls (A) (or one misfire avoidance control) from the plurality of types of misfire avoidance control so that a total value of the misfire limit expansion effect amounts is equal to or greater than the required misfire countermeasure effect amount and that a total value of fuel consumption deterioration degrees is minimized, with reference to the items of the misfire limit expansion effect amount and the fuel consumption deterioration degree of the misfire avoidance control selection map illustrated in FIG. 5. Then the selected misfire avoidance control (A) is executed.

In addition, when (2) the drivability priority is selected as the current priority condition at step 201 stated above, the process proceeds to step 203 to select a combination of the misfire avoidance controls (B) (or one misfire avoidance control) from the plurality of types of misfire avoidance control so that a total value of the misfire limit expansion effect amounts is equal to or greater than the required misfire countermeasure effect amount and that a total value of the drivability deterioration degrees is minimized, with reference to the items of the misfire limit expansion effect amount and the drivability deterioration degree of the misfire avoidance control selection map illustrated in FIG. 5. Then the selected misfire avoidance control (B) is executed.

In addition, when the (3) responsiveness priority is selected as the current priority condition at step 201 stated above, the process proceeds to step 204 to select a combination of the misfire avoidance controls (C) (or one misfire avoidance control) from the plurality of types of misfire avoidance control so that a total value of the misfire limit expansion effect amounts is equal to or greater than the required misfire countermeasure effect amount and that a total value of the responsiveness deterioration degrees is minimized, with reference to the items of the misfire limit expansion effect amount and the responsiveness deterioration degree of the misfire avoidance control selection map illustrated in FIG. 5. Then, the selected misfire avoidance control (C) is executed.

In addition, when the (4) emissions priority is selected as the current priority condition at step 201 stated above, the process proceeds to step 205 to select a combination of the misfire avoidance controls (D) (or one misfire avoidance control) from the plurality of types of misfire avoidance control so that a total value of the misfire limit expansion effect amounts is equal to or greater than the required misfire countermeasure effect amount and that a total value of the emissions deterioration degrees is minimized, with reference to the items of the misfire limit expansion effect amount and the emissions deterioration degree of the misfire avoidance control selection map illustrated in FIG. 5. Then, the selected misfire avoidance control (D) is executed.

Examples of the plurality of types of misfire avoidance control include the following controls.

Fuel injection amount increase control for increasing a fuel injection amount

First ignition energy increase control for increasing an ignition discharge time to increase ignition energy Second ignition energy increase control for increasing an ignition discharge current to increase ignition energy Third ignition energy increase control for increasing the number of times of ignition to increase ignition energy First airflow reinforcement control for reinforcing tumble flow within a cylinder by a tumble control valve Second airflow reinforcement control for reinforcing swirl flow within a cylinder by a swirl control valve Third airflow reinforcement control for increasing the speed of intake air flowing into a cylinder by decreasing a lift amount of an intake valve to narrow an intake passage into the cylinder, thereby reinforcing airflow Fourth airflow reinforcement control for injecting fresh air into a cylinder by a fresh air injection valve capable of injecting fresh air into the cylinder to reinforce airflow Intake air amount increase control for increasing a throttle opening degree to increase an intake air amount When the fuel injection amount is increased by the fuel injection amount increase control, it is possible to improve a combustion state by increasing ignitionability and a combustion speed of an air-fuel mixture and to prevent a misfire from occurring. In addition, when ignition energy is increased by ignition energy increase control, it is possible to improve a combustion state by increasing ignitionability of mixed air and to prevent a misfire from occurring. In addition, when airflow within a cylinder is reinforced by airflow reinforcement control, it is possible to improve a combustion state by increasing a combustion speed of an air-fuel mixture and to prevent a misfire from occurring. Further, when an intake air amount is increased by intake air amount increase control, it is possible to increase resistance to EGR by increasing the amount of air filled into a cylinder and to prevent a misfire from occurring.

In the routine of FIG. 4, the type and combination of misfire avoidance controls are changed according to the required misfire countermeasure effect amount, but there is no limitation thereto. For example, the amount of misfire avoidance control (e.g., a fuel injection increase amount, an ignition energy increase amount, an airflow reinforcement increase amount, and an intake air increase amount) or an execution timing may be changed according to the required misfire countermeasure effect amount.

Thereafter, the process proceeds to step 107 of FIG. 3 to calculate the actual misfire countermeasure effect amount in a case of the execution of the selected misfire avoidance control. In this case, for example, the actual misfire countermeasure effect amount is calculated using a map, a mathematical equation, or the like on the basis of an engine operation state (e.g., an intake air amount and an ignition timing) and the selected misfire avoidance control. The map, the mathematical equation, or the like for the actual misfire countermeasure effect amount is created in advance on the basis of experimental data, design data, and the like, and is stored in the ROM of the ECU 36. The process of step 107 serves as an actual misfire countermeasure effect amount calculation portion which is recited in claims.

Thereafter, the process proceeds to step 108 to compare the actual misfire countermeasure effect amount and the required misfire countermeasure effect amount and determine whether a misfire is avoidable when misfire avoidance control is executed. Specifically, it is determined whether a misfire is avoidable when misfire avoidance control is executed, according to whether a difference value between the actual misfire countermeasure effect amount and the required misfire countermeasure effect amount is greater than a predetermined threshold value. When the actual misfire countermeasure effect amount is greater than the required misfire countermeasure effect amount, a misfire is avoidable when misfire avoidance control is executed. Thus, it is possible to determine, with a high level of accuracy, whether a misfire is avoidable when misfire avoidance control is executed, by determining whether the difference value between the actual misfire countermeasure effect amount and the required misfire countermeasure effect amount is greater than the threshold value. The process of step 108 serves as misfire avoidance determination portion which is recited in claims.

When it is determined at step 108 that a misfire is avoidable when misfire avoidance control is executed, the process proceeds to step 111. Thus, when intake air amount increase control is executed (i.e., when intake air amount increase control is selected as misfire avoidance control), first torque correction control for preventing a change in torque (i.e., increase in torque) due to the intake air amount increase control is executed. Thus, it is possible to prevent the change in torque due to the intake air amount increase control by cancelling out the amount of increased torque due to the intake air amount increase control by the amount of decreased torque due to first torque correction control, and thus deterioration of driveability can be prevented.

Examples of the first torque correction control include the following controls.

Control for decreasing torque by pausing the operation of some of a plurality of cylinders of the engine 11

Control for decreasing torque by generating a braking force by an ABS (i.e., anti-lock braking system)

Control for decreasing torque by controlling an auxiliary machine (e.g., a compressor and an electric fan of an air conditioner) which is driven by electric power of the engine 11

On the other hand, when it is determined at step 108 stated above that a misfire is unavoidable in spite of the execution of misfire avoidance control, the process proceeds to step 109 to execute ignition delay restriction control for restricting a delay in an ignition timing. In the ignition delay restriction control, a delay restriction value (i.e., delay guard value or advance correction amount) of an ignition timing which is necessary for the misfire to be avoidable by misfire avoidance control is calculated, and the ignition timing delay amount is restricted using the delay restriction value.

Specifically, the delay guard value is calculated using a map, a mathematical equation, or the like on the basis of a difference value between the actual misfire countermeasure effect amount and the required misfire countermeasure effect amount, and the ignition timing delay amount is restricted so as not to exceed the delay guard value. Alternatively, an advance correction amount is calculated using a map, a mathematical equation, or the like on the basis of the difference value between the actual misfire countermeasure effect amount and the required misfire countermeasure effect amount, and the ignition timing delay amount is decreased by the advance correction amount. The map, the mathematical equation, or the like of the delay restriction value (i.e., delay guard value or advance correction amount) is created in advance on the basis of experimental data, design data, and the like and is stored in the ROM of the ECU 36. The delay restriction value (i.e., delay guard value or advance correction amount) may be calculated on the basis of a difference value between a misfire limit EGR gas amount and a cylinder-inflow EGR gas amount. The process of step 109 serves as an ignition delay restriction portion which is recited in claims.

Thereafter, the process proceeds to step 110 to execute second torque correction control for preventing a change in torque (i.e., increase in torque) due to the restriction of the delay in the ignition timing by the ignition delay restriction control. In the second torque correction control, control is executed for decreasing torque by controlling the amount of power generated by an alternator 48 (i.e., generator) that is driven by electric power of the engine 11. Specifically, a torque increase amount due to the restriction of the delay in the ignition timing by the ignition delay restriction control is calculated on the basis of the delay restriction value, the amount of power to be generated by the alternator 48 equivalent to a load torque necessary to cancel out the torque increase amount is calculated, and the alternator 48 is controlled to generate the calculated amount of power.

The second torque correction control is not limited to control (i.e., first control in claims) for decreasing torque by controlling the alternator 48. For example, at least one of control (i.e., second control in claims) for decreasing torque by controlling an auxiliary machine (e.g., a compressor and an electric fan of an air conditioner) which is driven by electric power of the engine 11, control (i.e., third control in claims) for decreasing torque by pausing the operation of some of the plurality of cylinders of the engine 11, and control (i.e., fourth control in claims) for decreasing torque by generating a braking force by an ABS may be executed as the second torque correction control.

Thereafter, when the process proceeds to step 111 to execute the intake air amount increase control (i.e., when the intake air amount increase control is selected as the misfire avoidance control), first torque correction control for preventing a change in torque (i.e., increase in torque) due to the intake air amount increase control is executed.

Thereafter, when it is determined at step 104 stated above that the difference value between the misfire limit EGR gas amount and the cylinder-inflow EGR gas amount is equal to or greater than a threshold value, the process proceeds to step 112 to terminate the misfire avoidance control (when the torque correction control is executed, the torque correction control is terminated as well).

(Estimation of Cylinder-Inflow EGR Gas Amount)

Next, an estimation method of a cylinder-inflow EGR gas amount will be described with reference to FIGS. 6 to 9.

In the present embodiment, in a case of a system that employs an LPL type EGR device 28, which recirculates EGR gas to the upstream side of the compressor 19 in the intake pipe 12 (i.e., an intake passage on the upstream side of the throttle valve 21), a cylinder-inflow EGR gas amount (In the following description, referred to as "cylinder-inflow EGR gas flow rate") is computed (i.e., estimated) by the ECU 36 in the following manner.

Figure 6:
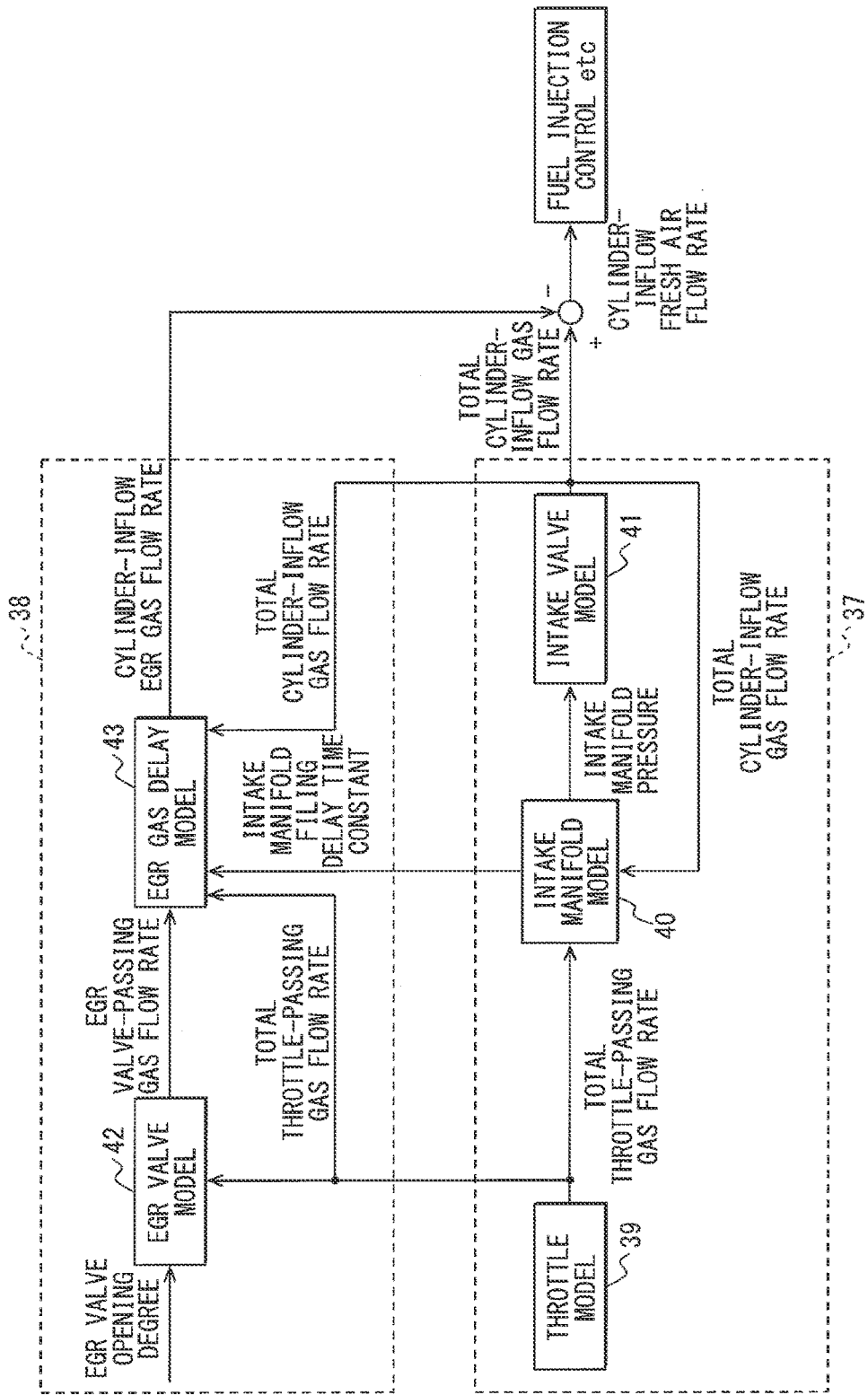
FIG. 6 is a block diagram illustrating a model for computing a cylinder-inflow EGR gas flow rate.

As illustrated in FIG. 6, first, a total cylinder-inflow gas flow rate computation unit 37 computes a total throttle-passing gas flow rate (i.e., a total flow rate of gas that passes through the throttle valve 21) using a throttle model 39 that simulates the behavior of gas, flowing through the intake pipe 12, at the time of passing through the throttle valve 21. For example, a throttle model disclosed in a patent document (JP 2008-101626 A) may be used as the throttle model 39.

In addition, a computed value of the total throttle-passing gas flow rate (i.e., the total throttle-passing gas flow rate computed using the throttle model 39) may be corrected using the flow rate of fresh air which is detected by the airflow meter 14 (i.e., flow rate of fresh air flowing through the intake pipe 12). Specifically, when a predetermined correction value learning condition is satisfied (e.g., in a steady operation state), a difference between the flow rate of fresh air detected by the airflow meter 14 and the computed value of the total throttle-passing gas flow rate is calculated as a gas flow rate correction value and is stored. The computed value of the total throttle-passing gas flow rate is corrected using the gas flow rate correction value. Thus, the total throttle-passing gas flow rate can be calculated with a high level of accuracy.

Alternatively, if a system that does not include the airflow meter 14, a flow rate of fresh air may be estimated (computed) on the basis of intake pipe pressure that is detected by an intake pipe pressure sensor (not shown), and the computed value of the total throttle-passing gas flow rate may be corrected using the estimated flow rate of fresh air. Specifically, when a predetermined correction value learning condition is satisfied (e.g., in a steady operation state), the flow rate of fresh air is estimated (i.e., computed) using a map, a mathematical equation, or the like on the basis of the intake pipe pressure detected by the intake pipe pressure sensor. A correction value of the flow rate of fresh air is computed using a map, a mathematical equation, or the like on the basis of an air-fuel ratio feedback correction amount, and the flow rate of fresh air estimated from the intake pipe pressure is corrected using the correction value. Thereafter, a difference between the flow rate of fresh air which is estimated from the intake pipe pressure (i.e., the corrected flow rate of fresh air) and the computed value of the total throttle-passing gas flow rate is calculated as a gas flow rate correction value and is stored. The computed value of the total throttle-passing gas flow rate is corrected using the gas flow rate correction value. Thus, even in the system that does not include the airflow meter 14, the total throttle-passing gas flow rate can be obtained with a high level of accuracy.

Thereafter, intake manifold pressure (i.e., pressure within an intake passage on a downstream side of the throttle valve 21) is computed on the basis of the total throttle-passing gas flow rate and a previous value of the total cylinder-inflow gas flow rate by using an intake manifold model 40 that simulates the behavior of gas at the time of being filled into the intake passage (the surge tank 23 and the intake manifold 24, etc.) on the downstream side of the throttle valve 21 after passing through the throttle valve 21. For example, an intake pipe model, which is disclosed in a patent document (JP 2008-101626 A), may be used as the intake manifold model 40.

Thereafter, the total cylinder-inflow gas flow rate (=cylinder-inflow flow rate of fresh air+cylinder-inflow EGR gas flow rate) is computed on the basis of the intake manifold pressure, using the intake valve model 41 that simulates the behavior of gas at the time of being drawn into the cylinder after being filled into the intake passage on the downstream side of the throttle valve 21. For example, an intake valve model disclosed in a patent document (JP 2008-101626 A) may be used as the intake valve model 41.

On the other hand, first, a cylinder-inflow EGR gas flow rate computation unit 38 computes an EGR valve-passing gas flow rate (i.e., a flow rate of EGR gas passing through the EGR valve 31), using the EGR valve model 42 that simulates the behavior of EGR gas, flowing through the EGR piping 29, at the time of passing through the EGR valve 31.

Figure 7:
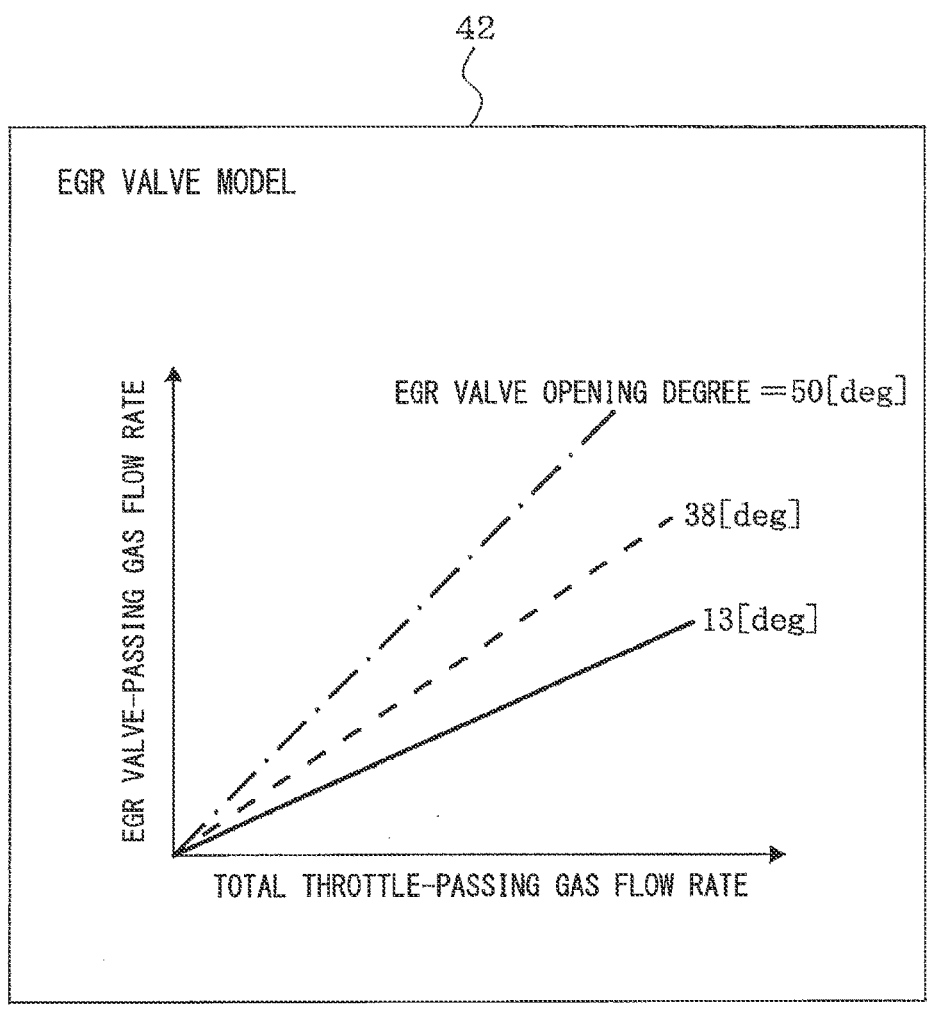
FIG. 7 is a diagram illustrating an EGR valve model.

As illustrated in FIG. 7, the EGR valve model 42 is constructed by a map that defines a relationship between the opening degree of the EGR valve 31, the total throttle-passing gas flow rate, and the EGR valve-passing gas flow rate The EGR valve-passing gas flow rate is computed on the basis of the opening degree of the EGR valve 31 and the total throttle-passing gas flow rate, using the map of the EGR valve-passing gas flow rate. The map of the EGR valve-passing gas flow rate is created in advance on the basis of experimental data, design data, and the like and is stored in the ROM of the ECU 36.

Alternatively, the EGR valve model 42 may be constructed by a physical equation that defines a relationship between the opening degree of the EGR valve 31, a pressure Pin on the upstream side of the EGR valve 31, a pressure Pout on the downstream side of the EGR valve 31, and an EGR valve-passing gas flow rate Megr.

Specifically, the EGR valve model 42 is approximated using the following equation of a throttle (i.e., equation of an orifice).

$$Megr = C \cdot A \cdot \frac{Pin}{\sqrt{R \cdot Tegr}} \cdot \Phi(Pout/Pin) \qquad \text{[Equation 1]}$$

Here, C denotes a flow rate coefficient, and A denotes an opening cross-sectional area of an EGR piping 29 which changes depending on the opening degree of the EGR valve 31. In addition, R denotes the gas constant, Tegr denotes a temperature of the EGR gas on the upstream side of the EGR valve 31, and $\phi(Pout/Pin)$ denotes a function that uses (Pout/Pin) as a variable.

In this case, the EGR valve-passing gas flow rate Megr is computed on the basis of the opening degree of the EGR valve 31, the pressure Pin on the upstream side of the EGR valve 31, the pressure Pout on the downstream side of the EGR valve 31, and the temperature of the EGR gas, using the equation of the throttle (i.e., the equation of the orifice) stated above.

Thereafter, the cylinder-inflow EGR gas flow rate is computed on the basis of the computed value of the EGR valve-passing gas flow rate, using an EGR gas delay model 43 (see FIG. 6) that simulates the behavior of the EGR gas until the time of passing through the throttle valve 21 and flowing into the cylinder after passing through the EGR valve 31.

Figure 8:
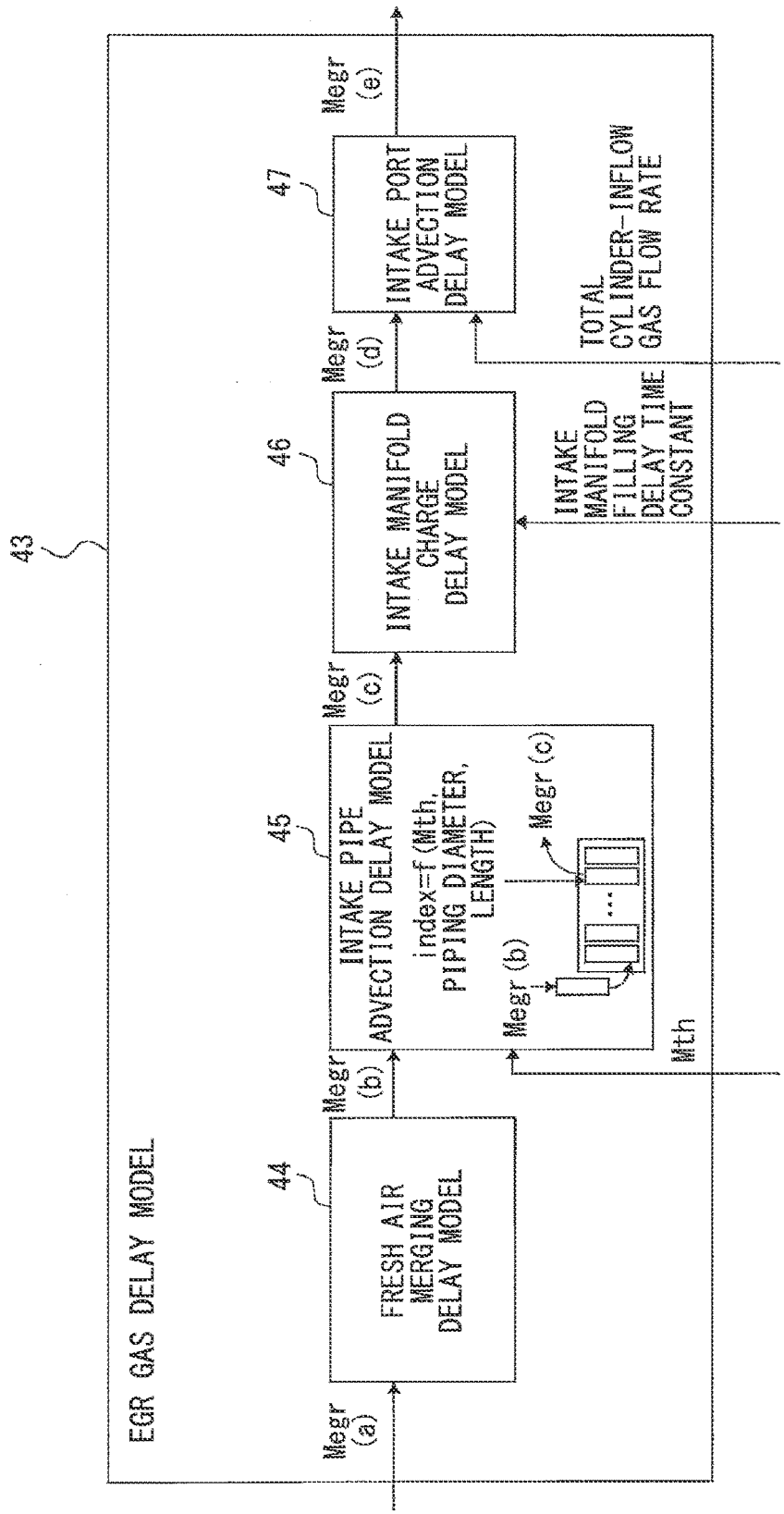
FIG. 8 is a block diagram illustrating an EGR gas delay model.

As illustrated in FIG. 8, the EGR gas delay model 43 includes a fresh air merging delay model 44, an intake pipe advection delay model 45, an intake manifold charge delay model 46, and an intake port advection delay model 47. The fresh air merging delay model 44 simulates the behavior of the EGR gas at the time of flowing into the intake passage on the upstream side of the throttle valve 21 (i.e., on the upstream side of the compressor 19 in the intake pipe 12) after passing through the EGR valve 31. The intake pipe advection delay model 45 simulates the behavior of the EGR gas until the time of passing through the throttle valve 21 after flowing into the intake passage on the upstream side of the throttle valve 21. The intake manifold charge delay model 46 simulates the behavior of the EGR gas at the time of being filled into the intake passage (i.e., the surge tank 23 and the intake manifold 24, etc.) on the downstream side of the throttle valve 21 after passing through the throttle valve 21. The intake port advection delay model 47 simulates the behavior of the EGR gas until the time of passing through the intake port and flowing into the cylinder after being filled into the intake passage on the downstream side of the throttle valve 21.

Thus, a delay in the EGR gas which occurs at the time of flowing into the intake passage on the upstream side of the throttle valve 21, an advection delay in the EGR gas which occurs until the time of flowing into the intake passage on the upstream side of the throttle valve 21 and passing through the throttle valve 21, a filling delay in the EGR gas which occurs at the time of being filled into the intake passage on the downstream side of the throttle valve 21 after passing through the throttle valve 21, and an advection delay in the EGR gas which occurs until the time of passing through the intake port and flowing into the cylinder after being filled into the intake passage on the downstream side of the throttle valve 21 can be reflected in the computation of the cylinder-inflow EGR gas flow rate. Thus, the estimation accuracy of the cylinder-inflow EGR gas flow rate can be improved.

When the cylinder-inflow EGR gas flow rate is computed, first, an EGR gas flow rate Megr(b) of the EGR gas flowing into the intake passage on the upstream side of the throttle valve 21 is computed on the basis of an EGR valve-passing gas flow rate Megr(a), using the fresh air merging delay model 44.

The fresh air merging delay model is approximated using the following Equation (1).

$$Megr(b) = \{K1/(\tau 1+1)\} \times Megr(a) \quad (1)$$

A coefficient K1 and a time constant $\tau 1$ of Equation (1) stated above are values that are determined depending on a piping diameter and the length of the EGR piping 29 (i.e., the portion of the EGR piping 29 from the EGR valve 31 to a merging portion at which the EGR piping is connected to the intake pipe 12), a piping diameter of the intake pipe 12, and the like. The coefficient and the time constant are calculated in advance on the basis of experimental data, design data, and the like.

Thereafter, an EGR gas flow rate Megr(c) of the EGR gas passing through the throttle valve 21 is computed on the basis of the EGR gas flow rate Megr(b), which is a flow rate of the EGR gas flowing into the intake passage on the upstream side of the throttle valve 21, and a total throttle-passing gas flow rate Mth, using the intake pipe advection delay model 45.

Figure 9:
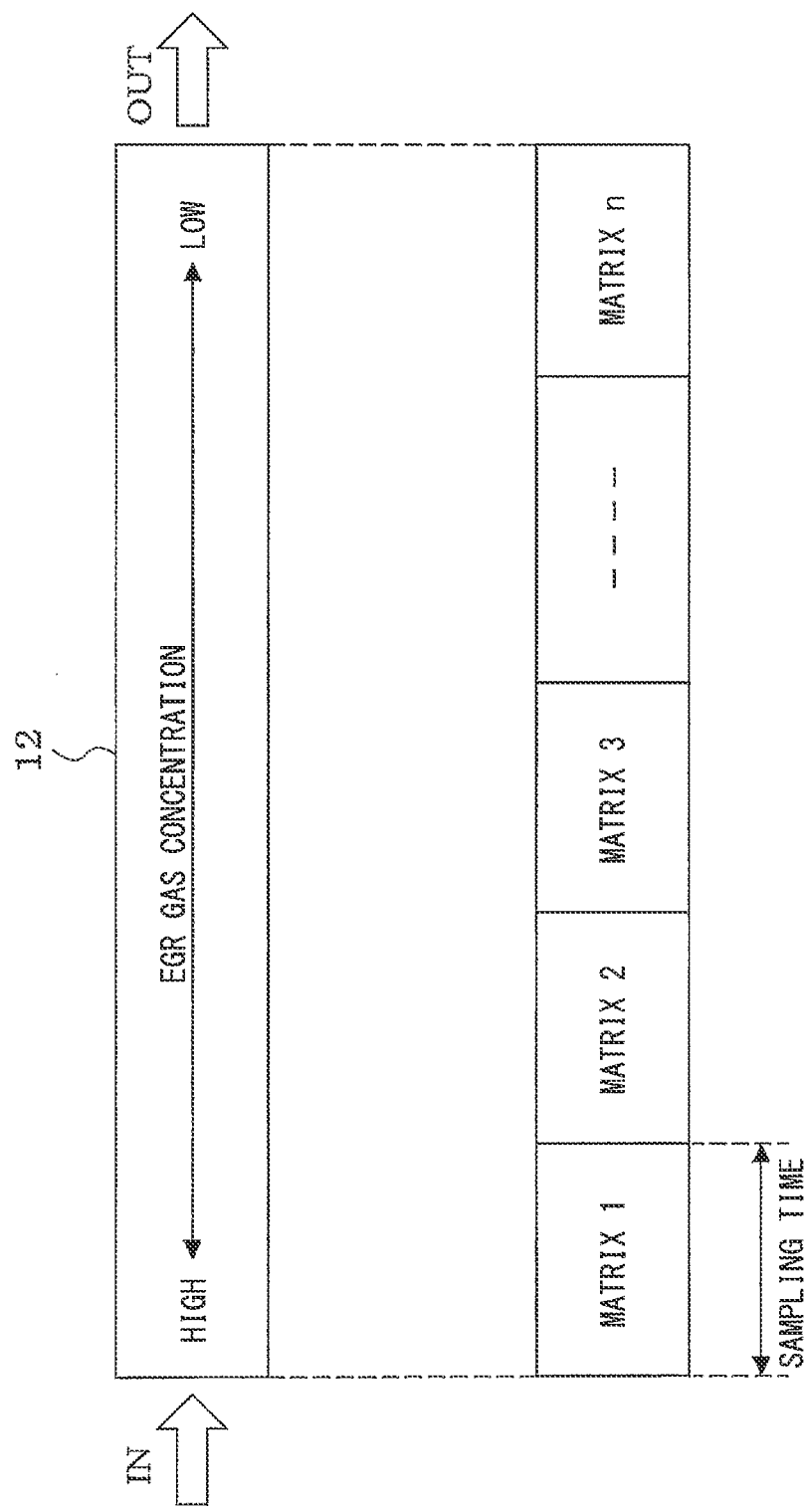
FIG. 9 is a diagram illustrating an intake pipe advection delay model.

As illustrated in FIG. 9, the intake pipe advection delay model 45 is constructed by matrices. The behavior of the EGR gas of a continuous time system, which is measured until the time of passing through the throttle valve 21 after flowing into the intake passage on the upstream side of the throttle valve 21, is constructed by the matrices which are formed at any time intervals through discretization (e.g., 32 matrices which are formed at 16 ms sampling time intervals through discretization). The intake pipe advection delay model includes a queue in which data is held in a first in first out list structure. In general, a transfer speed of the EGR gas within the intake pipe 12 is sufficiently slow as compared with a computation processing speed of the ECU 36, and thus the intake pipe advection delay model 45 can be constructed by matrices which are formed at any time intervals through the discretization. Various coefficients used in the intake pipe advection delay model 45 are values that are determined depending on a piping diameter and the length of the intake pipe 12 (i.e., the portion of the intake pipe from a merging portion at which the EGR piping 29 is connected to the intake pipe, to the throttle valve 21) and are calculated in advance on the basis of experimental data, design data, and the like.

Thereafter, as illustrated in FIG. 8, an EGR gas flow rate Megr(d) of the EGR gas filled into the intake passage (i.e., the surge tank 23 and the intake manifold 24) on the downstream side of the throttle valve 21 is computed on the basis of the EGR gas flow rate Megr(c) of the EGR gas passing through the throttle valve 21, using the intake manifold charge delay model 46.

The intake manifold charge delay model 46 is approximated using the following Equation (2).

$$Megr(d) = \{K2/(\tau 2+1)\} \times Megr(c) \quad (2)$$

A coefficient K2 and an intake manifold filling delay time constant $\tau 2$ of Equation (2) stated above are values that are determined depending on a piping diameter, the length, and the volume of the intake passage (i.e., the portion, such as the surge tank 23 and the intake manifold 24, on the downstream side of the throttle valve 21 in the intake pipe 12) on the downstream side of the throttle valve 21. The coefficient and the intake manifold filling delay time constant are calculated in advance on the basis of experimental data, design data, and the like. In a case where the intake manifold filling delay time constant is used in the intake manifold model 40, the intake manifold filling delay time constant used in the intake manifold model 40 may be used in the intake manifold charge delay model 46.

Thereafter, a cylinder-inflow EGR gas flow rate Megr(e) is computed on the basis of the EGR gas flow rate Megr(d) of the EGR gas, which is filled into the intake passage on the downstream side of the throttle valve 21, and the previous value of the total cylinder-inflow gas flow rate, using the intake port advection delay model 47.

The intake port advection delay model 47 is constructed by matrices. The behavior of the EGR gas of the continuous time system, which is measured until the time of passing through the intake port and flowing into the cylinder after being filled into the intake passage on the downstream side of the throttle valve 21, is constructed by the matrices which are formed at any time intervals through discretization. The intake port advection delay model includes a queue in which data is held in a first in first out list structure. Various coefficients used in the intake port advection delay model 47 are values that are determined depending on a piping diameter and the length of the intake port and are calculated in advance on the basis of experimental data, design data, and the like.

In the above-described embodiment, a cylinder-inflow EGR gas amount is estimated using a model that simulates the behavior of an EGR gas flow rate, a misfire limit EGR gas amount is calculated on the basis of an engine operation state, and the cylinder-inflow EGR gas amount is compared with the misfire limit EGR gas amount to predict whether a misfire may occur. When it is predicted that a misfire may occur, misfire avoidance control (e.g., fuel injection amount increase control, ignition energy increase control, airflow reinforcement control, and intake air amount increase control) is executed. Thus, since misfire avoidance control can be executed when it is predicted that a misfire may occur due to an excessive increase in a cylinder-inflow EGR gas amount, regardless of deceleration and re-acceleration, a misfire during the deceleration and the re-acceleration due to EGR gas is avoidable.

Figure 10:
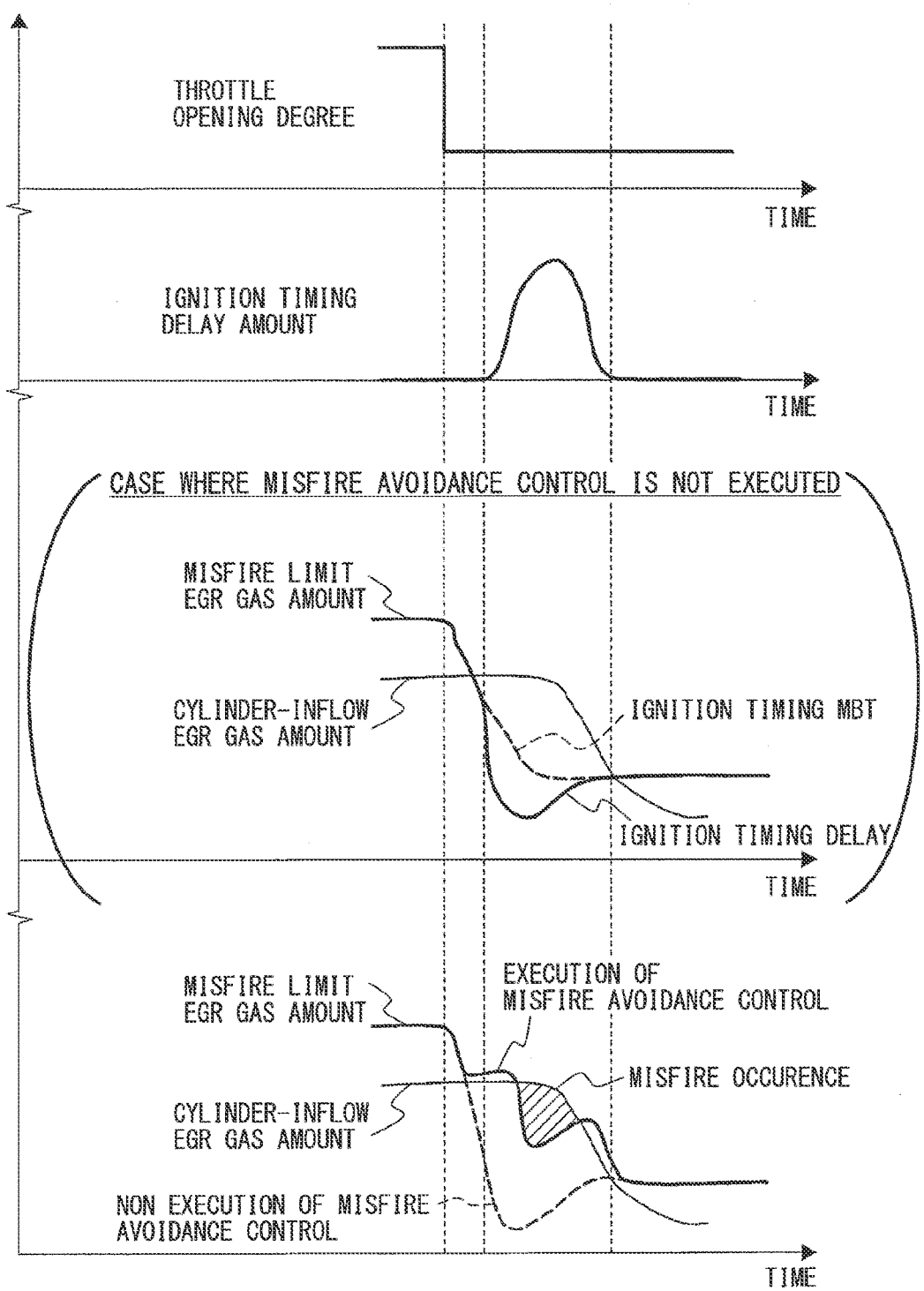
FIG. 10 is a time chart illustrating an execution example of misfire avoidance control according to a comparative example.

However, in a system that secures deceleration by executing control (i.e., control for increasing an ignition timing delay amount) for delaying an ignition timing of the engine 11 at the time of deceleration to decrease torque, a misfire limit EGR gas amount is reduced when control for delaying the ignition timing at the time of deceleration is executed (see FIG. 10). For this reason, as in a comparative example illustrated in FIG. 10, in a case where ignition delay restriction control is not executed, even though a misfire limit EGR gas amount is increased by the execution of misfire avoidance control, the effects thereof may be insufficient depending on deceleration conditions, and thus there is a possibility of a misfire being unavoidable.

Figure 11:
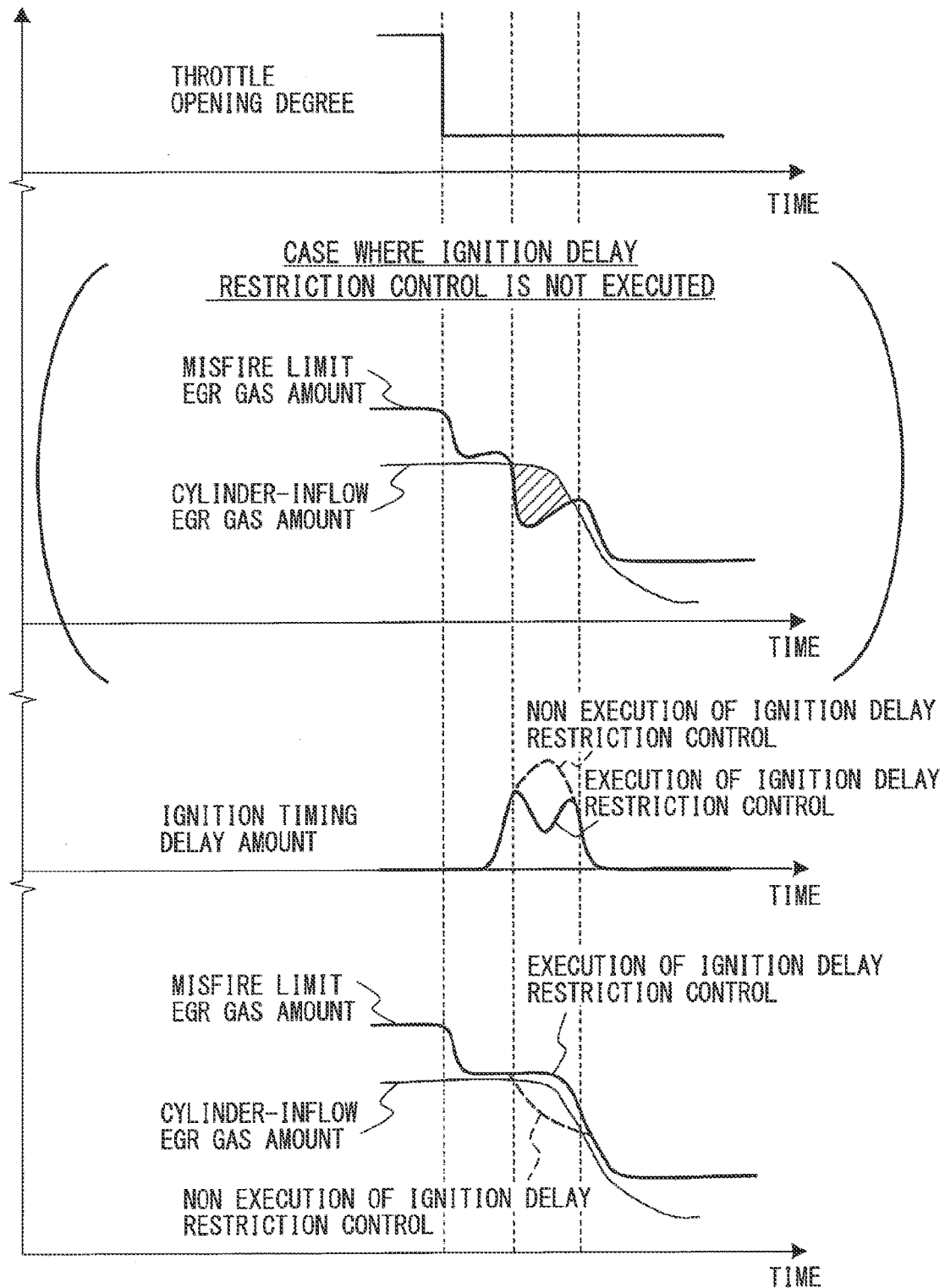
FIG. 11 is a time chart illustrating an execution example of misfire avoidance control according to the embodiment.

On the other hand, in this embodiment illustrated in FIG. 11, an actual misfire countermeasure effect amount in a case of the execution of misfire avoidance control is calculated, and the actual misfire countermeasure effect amount is compared with the required misfire countermeasure effect amount to determine whether a misfire is avoidable when misfire avoidance control is executed. When it is determined that a misfire is unavoidable in spite of the execution of the misfire avoidance control, ignition delay restriction control is executed for calculating a delay restriction value (i.e. delay guard value or advance correction amount) of an ignition timing which is required for capability for avoiding the misfire by the misfire avoidance control and for restricting an ignition timing delay amount using the delay restriction value. Thus, it is possible to suppress a reduction in a misfire limit EGR gas amount by improving a combustion state and to avoid a misfire by the misfire avoidance control. In this case, since it is not necessary to decrease the amount of EGR gas in order to avoid the misfire, it is possible to maintain fuel consumption enhancing effects due to the EGR gas.

Incidentally, if an ignition timing delay is restricted by the ignition delay restriction control, torque of the engine 11 is increased, and thus there is a possibility of deceleration being insufficient in this state.

Regarding this point, in this embodiment, as illustrated in FIG. 12, the second torque correction control (e.g., control of decreasing torque by controlling the amount of power generated by the alternator 48) for preventing a change in torque (i.e., increase in torque) due to the restriction of a delay in an ignition timing by the ignition delay restriction control is executed. Thus, it is possible to prevent the change in torque due to the ignition delay restriction control by cancelling out the amount of increased torque due to the ignition delay restriction control by the amount of decreased torque due to the second torque correction control, and to secure deceleration having the same degree as that in a case where an ignition timing is delayed as usual (e.g., in a case where the ignition timing delay is not restricted).

In addition, in this embodiment, at the time of ignition delay restriction control, a delay restriction value (i.e., delay guard value or advance correction amount) of an ignition timing which is necessary for a misfire to be avoidable by misfire avoidance control is calculated, and the ignition timing delay amount is restricted using the delay restriction value. Thus, it is possible to prevent the ignition timing delay amount from being restricted more than necessary (i.e., prevent the ignition timing delay amount from being decreased more than necessary).

In the above-described embodiment, a cylinder-inflow EGR gas amount is computed (i.e., estimated) using a model that simulates the behavior of an EGR gas flow rate. However, an estimation method of the cylinder-inflow EGR gas amount is not limited thereto, and may be appropriately changed. For example, the cylinder-inflow EGR gas amount may be computed (i.e., estimated) on the basis of an output signal and the like of an intake pipe pressure sensor or an air flow meter. In addition, the amount of EGR gas remaining within the intake pipe 12 may be detected as information of the cylinder-inflow EGR gas amount by using a sensor.

Additionally, in the above-described embodiment, a required misfire countermeasure effect amount necessary for misfire avoidance is calculated on the basis of a difference between the cylinder-inflow EGR gas amount and the misfire limit EGR gas amount, but is not limited thereto. For example, the required misfire countermeasure effect amount necessary for misfire avoidance may be calculated on the basis of the cylinder-inflow EGR gas amount and an engine operation state, in consideration of a change in misfire limit EGR gas amount depending on the engine operation state (e.g., an intake air amount).

Moreover, in the above-described embodiment, the present disclosure is applied to the engine that is provided with the turbocharger and employs the LPL type (i.e., low pressure loop type) EGR device 28, which recirculates the EGR gas from the downstream side of the exhaust turbine 18 in the exhaust pipe 15 (e.g., from the downstream side of the catalyst 16) to the upstream side of the compressor 19 in the intake pipe 12, but is not limited thereto. For example, the present disclosure may be applied to an engine that is provided with a turbocharger and employs an HPL type (i.e., high pressure loop type) EGR device, which recirculates the EGR gas from an upstream side of an exhaust turbine in an exhaust pipe to a downstream side of a compressor in an intake pipe (e.g., to a downstream side of a throttle valve).

Further, the present disclosure is not limited to the engine having the exhaust turbine driving type turbocharger mounted therein. The present disclosure may be applied to an engine having a mechanical turbocharger or an electric turbocharger mounted therein.

Even further, the present disclosure is not limited to the engine which is provided with the turbocharger, and may be applied to a normal aspiration engine (i.e., NA engine) which is not provided with a turbocharger.

What is claimed is:

1. A control device for an internal combustion engine which is provided with an EGR device recirculating, as EGR gas, a portion of exhaust gas of an internal combustion engine to an intake passage and delays an ignition timing of the internal combustion engine at the time of deceleration, the control device comprising:
a cylinder-inflow EGR gas amount determination portion that determines a cylinder-inflow EGR gas amount of EGR gas flowing into a cylinder of the internal combustion engine;
a misfire occurrence prediction portion that predicts whether a misfire occurs, based on the cylinder-inflow EGR gas amount and an operation state of the internal combustion engine;
a misfire avoidance control portion that executes misfire avoidance control to avoid the misfire when the misfire occurrence prediction portion predicts the misfire;
a misfire avoidance determination portion that determines whether the misfire is unavoidable even if the misfire avoidance control is executed; and
an ignition delay restriction portion that restricts a delay in the ignition timing when the misfire avoidance determination portion determines that the misfire is unavoidable, wherein
upon the misfire avoidance prediction portion determining that the misfire is unavoidable even if the misfire avoidance control is executed, the misfire avoidance control portion executes the misfire avoidance control in a state of the ignition delay restriction portion having restricted the delay in the ignition timing,
the control device further comprises:
a misfire limit EGR gas amount calculation portion that calculates a misfire limit EGR gas amount which is an upper limit of a normally-combustible cylinder-inflow EGR gas amount, based on the operation state of the internal combustion engine;

a required misfire countermeasure effect amount calculation portion that calculates a required misfire countermeasure effect amount necessary for avoiding the misfire, based on a difference between the cylinder-inflow EGR gas amount and the misfire limit EGR gas amount; and an actual misfire countermeasure effect amount calculation portion that calculates an actual misfire countermeasure effect amount in a case of the execution of the misfire avoidance control, the misfire avoidance determination portion compares the actual misfire countermeasure effect amount and the required misfire countermeasure effect amount to determine whether the misfire is unavoidable.

2. The control device for an internal combustion engine according to claim 1, wherein the ignition delay restriction portion calculates a delay restriction value of the ignition timing for avoiding the misfire during the misfire avoidance control, and restricts the amount of a delay in the ignition timing based on the delay restriction value.

3. The control device for an internal combustion engine according to claim 1, wherein the misfire avoidance control portion executes, as the misfire avoidance control, at least one of a fuel injection amount increase control to increase a fuel injection amount of the internal combustion engine, an ignition energy increase control to increase ignition energy of the internal combustion engine, an airflow reinforcement control to reinforce airflow within the cylinder of the internal combustion engine, or an intake air amount increase control to increase an intake air amount of the internal combustion engine.

4. The control device for an internal combustion engine according to claim 1, wherein the ignition delay restriction portion executes a torque correction control to prevent a change in torque due to the restriction of the delay in the ignition timing.

5. The control device for an internal combustion engine according to claim 4, wherein the ignition delay restriction portion executes, as the torque correction control, at least one of a first control to decrease torque by controlling a generator that is driven by the internal combustion engine, a second control to decrease torque by controlling an auxiliary machine that is driven by the internal combustion engine, a third control to decrease torque by pausing operation of cylinders of the internal combustion engine, or a fourth control to decrease torque by generating a braking force by an anti-lock braking system.

* * * * *